United States Patent
Marinelli (10) Patent No.: US 12,117,082 B2
(45) Date of Patent: Oct. 15, 2024

(54) SEAL CARTRIDGE ASSEMBLY AND METHOD FOR MOUNTING A SEAL CARTRIDGE ASSEMBLY

(71) Applicant: Siemens Energy Global GmbH & Co. KG, Munich (DE)

(72) Inventor: Giampiero Marinelli, Montivilliers (FR)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/926,398

(22) PCT Filed: Apr. 27, 2021

(86) PCT No.: PCT/EP2021/060899
§ 371 (c)(1),
(2) Date: Nov. 18, 2022

(87) PCT Pub. No.: WO2021/239361
PCT Pub. Date: Dec. 2, 2021

(65) Prior Publication Data
US 2023/0184334 A1     Jun. 15, 2023

(30) Foreign Application Priority Data

May 26, 2020 (EP) .................................. 20290045

(51) Int. Cl.
*F16J 15/34* (2006.01)
*F16J 15/00* (2006.01)
*F16J 15/447* (2006.01)

(52) U.S. Cl.
CPC ......... *F16J 15/3464* (2013.01); *F16J 15/002* (2013.01); *F16J 15/447* (2013.01)

(58) Field of Classification Search
CPC ........ F16J 15/34; F16J 15/3464; F16J 15/348; F16J 15/3484; F16J 15/002; F16J 15/447
See application file for complete search history.

(56) References Cited

U.S. PATENT DOCUMENTS

| | | | | |
|---|---|---|---|---|
| 3,701,488 A | * | 10/1972 | Fisher | D21D 1/30 241/259.1 |
| 4,815,747 A | | 3/1989 | Wolford | |
| 5,066,026 A | * | 11/1991 | Heck | F16J 15/3412 277/400 |

(Continued)

FOREIGN PATENT DOCUMENTS

GB       1023753 A      3/1966

OTHER PUBLICATIONS

PCT International Search Report and Written Opinion of International Searching Authority mailed Jul. 14, 2021 corresponding to PCT International Application No. PCT/EP2021/060899 filed Apr. 27, 2021.

*Primary Examiner* — Gilbert Y Lee
(74) *Attorney, Agent, or Firm* — Wolter Van Dyke Davis, PLLC (57) ABSTRACT

A method for assembling a seal cartridge and a seal cartridge, wherein the seal cartridge includes a set of sealing components configured for being removably assembled to each other so as to form the seal cartridge and wherein at least one of said sealing components is configured for being secured to another sealing component and/or to a shaft casing by a tenon and mortise joint system.

11 Claims, 9 Drawing Sheets

(56) References Cited

U.S. PATENT DOCUMENTS

| | | | | |
|---|---|---|---|---|
| 6,142,479 A | * | 11/2000 | Fedorovich | F16J 15/4478 |
| | | | | 277/412 |
| 2008/0174073 A1 | | 7/2008 | Simmons | |
| 2010/0201074 A1 | | 8/2010 | Haynes | |
| 2019/0226585 A1 | * | 7/2019 | Snow | F02C 7/28 |

* cited by examiner

SEAL CARTRIDGE ASSEMBLY AND METHOD FOR MOUNTING A SEAL CARTRIDGE ASSEMBLY

CROSS REFERENCE TO RELATED APPLICATIONS

This application is the US National Stage of International Application No. PCT/EP2021/060899 filed 27 Apr. 2021, and claims the benefit thereof. The International Application claims the benefit of European Application No. EP20290045 filed 26 May 2020. All of the applications are incorporated by reference herein in their entirety.

FIELD OF INVENTION

The invention relates to the technical field of mechanical seals for machines comprising rotating assemblies, like a shaft, and concerns more precisely seal cartridges.

BACKGROUND OF INVENTION

Mechanical seals are mechanical devices that are designed for helping to join mechanical components together by preventing leakage, and/or containing pressure, and/or excluding contamination. They are notably widely used in machines comprising rotating assemblies, like dry gas seals (i.e. a mechanical seal using a sealing gas to create a barrier between a process gas and the atmosphere) equipping most of the centrifugal gas compressors or gas turbines. Mechanical seals for rotating assemblies, and in particular dry gas seals, are available in a great variety of configurations and are usually contained within one or several cartridges. For instance, tandem dry gas seals comprise a primary seal and a secondary seal contained within a single cartridge, wherein the secondary seal serves as backup in case of failure of the primary seal.

The seal cartridge might be described as an assembly of mechanical components that forms typically a cylindrical hollow body and has therefore a cylindrical hollow shape, wherein the hollow part is configured for receiving a shaft or rotating member against which seal components of the cartridge are arranged, said cylindrical hollow body being then installed in a shaft casing, also called seal cavity, of a machine, wherein said shaft casing or seal cavity surrounds said shaft, providing a sealing between the shaft and the casing (or internal wall of the seal cavity). One of the main advantages of using a seal cartridge for sealing a shaft is its removability: the seal cartridge is indeed mounted removable inside the seal cavity, annularly around the shaft, so that removing/installing the cartridge removes/installs at the same time all scaling components comprised within the seal cartridge, enabling a quick assembly/disassembly of the scaling components.

Typically, a seal cartridge comprises an axial stack of ring-shaped sealing components configured for being mounted annularly around the shaft (i.e. according to the axial/longitudinal direction of the stack), giving rise therefore to said cylindrical hollow shape of the cartridge. Among said ring-shaped sealing components (or annular components), one can distinguish:

housing components that are ring-shaped sealing components characterized by an outside diameter that is configured for matching an inner space of a shaft casing; and shaft sleeve components that are ring-shaped sealing components characterized by an inside diameter configured for matching the size, i.e. diameter, of the shaft.

According to usual cartridge constructions, housing components are mounted or located radially over the shaft sleeves and are usually designed for maintaining in a predefined position within the cartridge other ring-shaped sealing components like stationary sealings or clamping rings, and/or for serving as support for such ring-shaped sealing components. During rotation of the shaft, the housing components are configured for remaining stationary with respect to said rotation. As for the shaft sleeve, it is configured for shrouding the shaft so as to form a sleeve around said shaft. It can remain stationary or be driven into rotation by a rotation of the shaft. In this case, the shaft sleeve rotates together with the shaft, at the same angular speed. The outside diameters and inside diameters of the stack of housing components and shaft sleeves define respectively an external and an internal substantially cylindrical surface of the seal cartridge that fits respectively within said internal space of the shaft casing or seal cavity of a machine (e.g. a pump or compressor) and with the shaft geometry of said machine so that the shaft can be received within the hollow part of the cartridge when mounting the seal cartridge inside said shaft casing. The housing components are usually coupled or fixed to each other by means of screws and/or bolts for forming a united body, i.e. said cartridge, enclosing all sealing components. Typically, radial or axial screws are used for axially or radially coupling the housing components.

Prior art cartridges are complex devices whose assembly and disassembly require specific knowledge and skills for mounting or dismounting the different cartridge ring-shaped sealing components. For instance, unprecise assembly of the different ring-shaped sealing components, e.g. a misalignment, may strongly decrease the efficiency of the sealing or may lead to a failure, e.g. a screw rupture or thread damage.

SUMMARY OF INVENTION

An objective of the present invention is to propose a method for mounting a seal cartridge and a seal cartridge assembly that facilitate the assembly and disassembly of seal cartridges, and that provide a less complex and more compact cartridge, and consequently a simpler manufacturing of the cartridge components.

This objective is solved by the measures taken in accordance with the independent claims. Further advantageous embodiments are proposed by the dependent claims.

The present invention concerns a seal cartridge configured for providing a sealing between a rotatable shaft that typically equips a machine, like a compressor, and a shaft casing or seal cavity of such a machine. The seal cartridge according to the invention has a substantially hollow shape, preferentially a substantially cylindrical hollow shape, around a longitudinal axis A passing by the center of the seal cartridge and corresponding to the axis of rotation of the shaft when the seal cartridge surrounds said shaft in the shaft casing or seal cavity, i.e. when it is mounted annularly around said rotatable shaft in said shaft casing/cavity. The hollow shape of the seal cartridge is typically characterized by an external size, e.g. an external diameter for the substantially cylindrical hollow shape, configured for matching an internal space of the shaft casing and an internal diameter configured for matching the size (i.e. diameter) of the rotatable shaft. Of course, the (cylindrical) hollow shape might also be characterized by several external sizes (diameters) and/or internal diameters for matching a shaft casing and/or shaft characterized by different radial sizes. The seal cartridge according to the invention comprises a set, or more precisely stack, of scaling components (i.e. components which directly provide a sealing and/or participate to the sealing, e.g. by supporting a seal), preferentially ring-shaped scaling components, configured for being removably assembled with each other so as to form the seal cartridge. According to the present invention, at least one of said sealing components, called hereafter the TMRS component, is configured for being secured (or fixed) to another of said scaling components and/or to the shaft casing by means of a tenon and mortise joint system. For instance and preferentially, the TMRS component is a ring-shaped sealing component configured for being secured (or fixed) to another ring-shaped sealing component and/or to the shaft casing by means of said tenon and mortise joint system.

Preferentially, the TMRS component is configured for being mounted annularly around the shaft and is characterized by an inner diameter configured for matching the size or one of the sizes (i.e. diameter) of the shaft. Alternately or additionally, the TMRS component is configured for being mounted annularly around the shaft and is characterized by an outer size or diameter configured for matching the size or one of the sizes of the shaft casing. Preferentially, the TMRS component is configured for remaining stationary during a rotation of the rotatable shaft. In particular, the TMRS component can comprise at least one part configured for rotating together with the rotatable shaft during a rotation of the rotatable shaft, and can comprise optionally another part that remains stationary. In particular, the whole TMRS component is configured for rotating together with said rotatable shaft. Preferentially, the TMRS component is a housing component and/or a shaft sleeve. It is for instance a housing component configured for forming at the same time a sleeve around the shaft.

According to the present invention, the joint system is configured for ensuring a coupling of the TMRS component to said another scaling component and/or shaft casing by relative rotation, around said longitudinal axis, of the TMRS component with respect to said another sealing component and/or shaft casing. It typically replaces screws/bolts joint systems that are used for joining housing components together, increasing the tensile strength and the compactness of the cartridge. Tenons and/or mortises of the TMRS joint system are configured for cooperating with the mortises and/or tenons of a joint system equipping the other sealing component or shaft casing.

In particular, the joint system of the TMRS component comprises one or several tenons and/or one or several mortises, wherein each tenon, resp. mortise, is configured for cooperating with a mortise, resp. tenon, of a joint system equipping said another scaling component and/or the shaft casing, for securing or fixing the TMRS component to said scaling component and/or shaft casing by rotating the TMRS component relatively to said another sealing component and/or shaft casing. According to the claimed joint system, only a rotation of the TMRS component is required for securing it together with another sealing component of the seal cartridge or shaft casing, freeing therefore the fixation from a use of screws, which prevents screw ruptures or thread damages. Additionally, the mortise and tenons can be easily adapted and optimized in function of the shaft and shaft casing features, as well as requirements of the machine. Preferentially, the tenons and/or mortises are equidistantly distributed along the circumference of the TMRS component, e.g. on a face configured for facing said another scaling component or shaft casing. Optionally, the TMRS component comprises or is configured for cooperating with a pin system for securing it to said another scaling component and/or shaft casing. The pin system is configured for preventing their relative rotation.

Additionally, using a rotation of the TMRS component for fixing it to another scaling component and/or shaft casing enables to automatically center the TMRS component with respect to said another scaling component and/or shaft casing during the rotation. For instance, at 0° of relative rotation, the TMRS is in a loose position wherein the mortise and tenon joint system is characterized by a first play between the corresponding tenon and mortise parts which have to clamp with each other by rotation, and then, by relatively rotating the TMRS component with respect to said another sealing component and/or shaft casing said play is reduced to zero until reaching a secured position for the TMRS component, wherein the TMRS component is fixed to said another sealing component and/or shaft casing. Consequently, assembling and disassembling sealing components of the cartridge is facilitated.

In particular, the present invention concerns also a method for assembling a seal cartridge, the method comprising assembling the sealing components, preferentially ring-shaped sealing components, with each other in order to form said stack of sealing components, and being characterized in that it comprises coupling at least one of said sealing components—i.e. said TMRS component—to another of said sealing components of the seal cartridge and/or to the shaft casing by rotating said TMRS component around the longitudinal axis and relatively to said another sealing component and/or to the shaft casing. Said rotation enables notably each tenon, and/or respectively mortise, of the joint system of the TMRS component to interlock (or slot) with a mortise, and/or respectively tenon, of the joint system of said another sealing component and/or shaft casing.

BRIEF DESCRIPTION OF THE DRAWINGS

Further description and details of the invention will be described now on the basis of embodiments illustrated by the following figures.

DETAILED DESCRIPTION OF INVENTION

In the following embodiments, the case of a seal cartridge with a substantially cylindrical hollow shape will be taken as illustration, wherein the sealing components joined using the tenon and mortise joint system according to the invention are ring-shaped sealing components. Of course, the external shape of the seal cartridge is not limited as long as it can receive the rotatable shaft and fits into the seal cavity.

Figure 1:
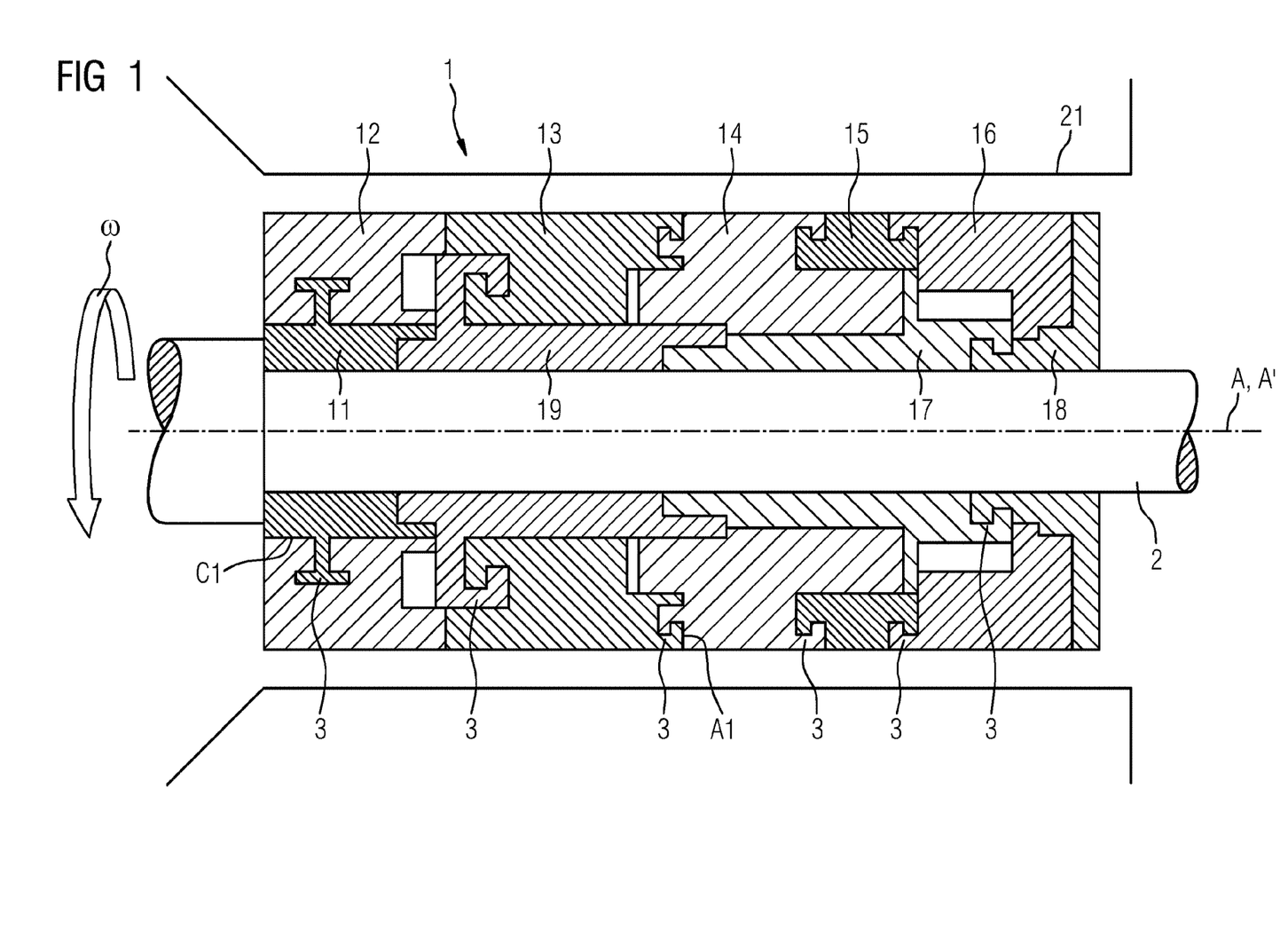
FIG. 1 Cross sectional side view of a schematic representation of a seal cartridge according to the invention.

FIG. 1 shows a longitudinal cross-section of a schematic representation of a seal cartridge 1 according to the invention. As known in the art, the seal cartridge 1 may comprise a stack of various ring-shaped sealing components 11-19 built according to different configurations and geometries. By stack, it has to be understood an axially centered assembly ("axially centered" with respect to the longitudinal axis of the seal cartridge) of ring-shaped sealing components, wherein the ring-shaped sealing components are preferentially mounted one after another axially on top (when considering the longitudinal axis of the cartridge being vertical) and/or radially around (or over) a previously mounted ring-shaped sealing component, forming therefore a kind of pile or stack of ring-shaped sealing components which results in said cartridge. The aim of FIG. 1 is simply to present the concept of the invention without focusing on any specific seal cartridge type, configuration, geometry, or construction. More detailed embodiments will be presented afterwards.

According to FIG. 1, the seal cartridge 1 is mounted annularly around a rotatable shaft 2 that is configured for rotating around a longitudinal axis A' of rotation according to an angular speed ω. The seal cartridge 1 is configured for being removably installed in a shaft casing 21 which surrounds and encloses the shaft 2 and its sealings provided by the seal cartridge 1. The seal cartridge 1 typically provides a sealing between the rotatable shaft 2 and the shaft casing 21, preventing for instance any leakage of a process gas or contamination of the process gas. Preferentially, the seal cartridge according to the invention is a dry gas seal cartridge. The seal cartridge has typically a cylindrical shape centered around a longitudinal axis A that coincides with the longitudinal axis A' when the seal cartridge is mounted in the shaft casing 21 annularly around the shaft 2.

According to the present invention, at least one, or a part, or each ring-shaped sealing component 11-19 of the seal cartridge is a TMRS component, i.e. is configured for being coupled to at least one another ring-shaped sealing component by means of a tenon and mortise joint system 3. The coupling according to the claimed tenon and mortise joint system 3 is advantageously free of any screw and/or bolt that would fix TMRS components together. Optionally, at least one TMRS component comprises a tenon and mortise joint system 3 configured for coupling it to the shaft casing 21. As schematically shown in FIG. 1, a first TMRS component 11 is for instance a shaft sleeve coupled by means of the claimed tenon and mortise joint system 3 to a second TMRS component 12, wherein the second TMRS component 12 is a housing component configured for housing one or several seal elements and located radially over the first TMRS component 11. Or a third TMRS component 13 is a housing component coupled to a fourth TMRS component 14 by means of said tenon and mortise system, wherein the fourth TMRS component 14 is also a housing component configured for housing one or several seal elements. A fifth TMRS component 15 is for instance a labyrinth seal that is coupled by means of said tenon and mortise joint system to one or several ring-shaped sealing components, e.g. to the fourth TMRS component 14 on one axial side of the fifth TMRS component 15 and/or to a sixth TMRS component 16 on the other axial side of the fifth TMRS component 15, wherein the sixth TMRS component 16 is a housing component. For instance, a seventh TMRS component 17 is a shaft sleeve coupled by means of said tenon and mortise joint system 3 to an eighth TMRS component 18 that is also a shaft sleeve.

The TMRS component according to the invention might be any ring-shaped, i.e. annular, sealing component of the seal cartridge, like a housing or a shaft sleeve or a ring, etc. Preferentially, TMRS component is a housing component of the seal cartridge and it is coupled by means of the tenon and mortise joint system to another component that is:
  a labyrinth seal of the seal cartridge; or
  another housing component of the seal cartridge; or
  a barrier seal of the seal cartridge; or
  a stationary sleeve of the seal cartridge; or
  a stationary seal ring of the seal cartridge.

The TMRS component might also be a rotatable seal cartridge shaft sleeve, e.g. a shaft sleeve affixed to the shaft and enclosing a mating ring, the shaft sleeve and mating ring rotating at the shaft rotational speed, wherein the shaft sleeve is coupled by means of the tenon and mortise joint system to another component that is:
  another shaft sleeve of the seal cartridge; or
  a ring of the seal cartridge, like a mating ring; or
  another component of the seal cartridge or of the shaft casing that is configured for rotating together with the shaft sleeve.

Figure 2:
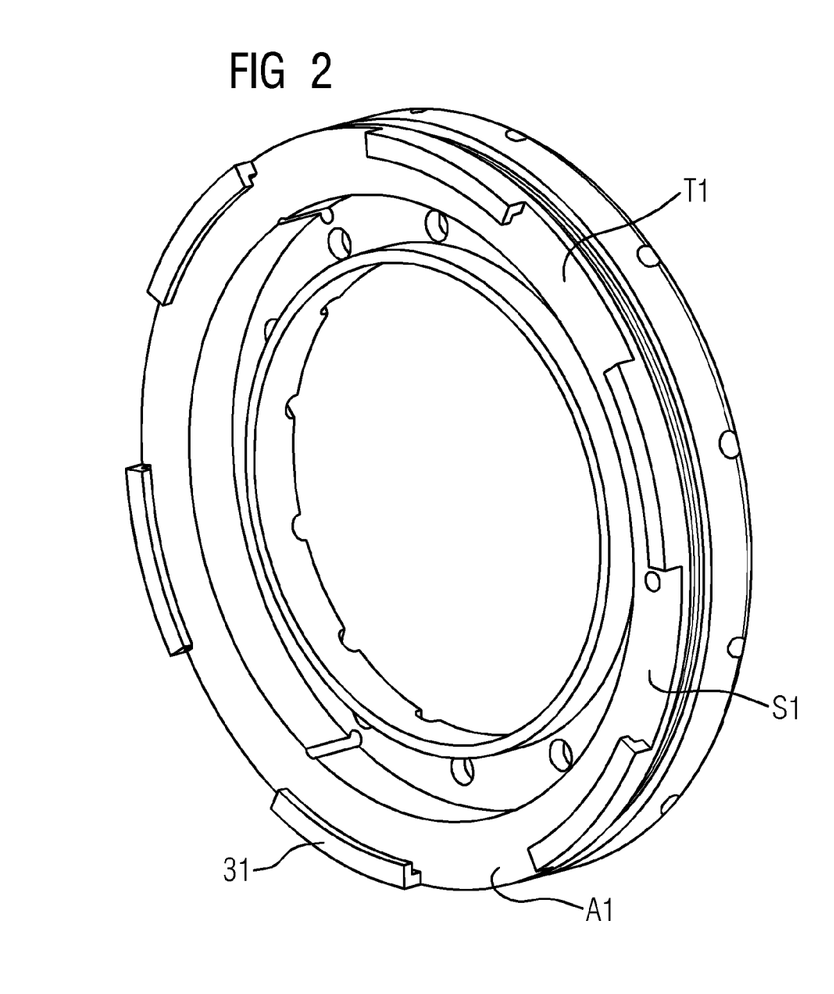
FIG. 2 Schematic representation of a three-dimensional seal cartridge housing component equipped with a tenon and mortise joint system according to the invention.
Figure 3:
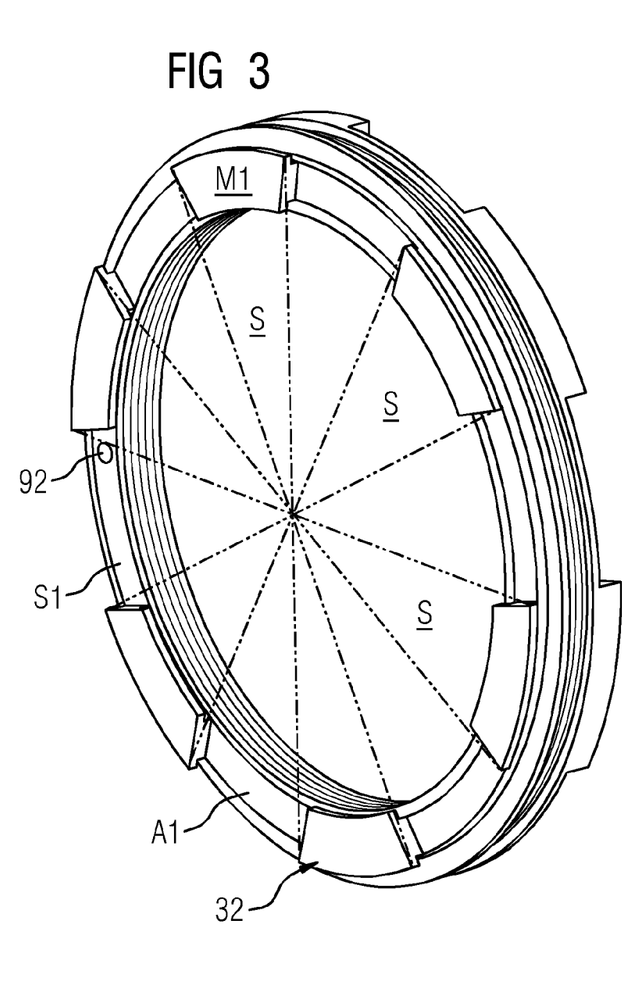
FIG. 3 Schematic representation of a three-dimensional labyrinth seal according to the invention.
Figure 4:
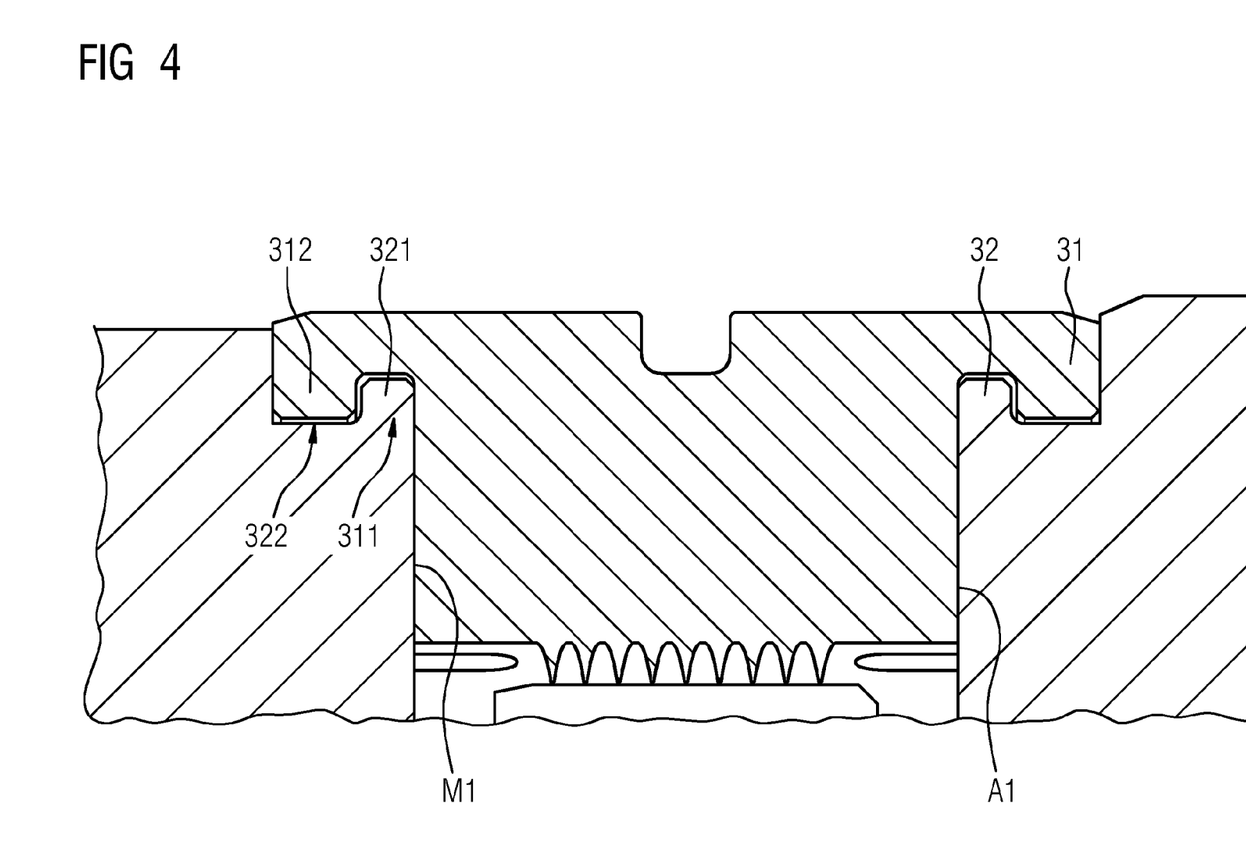
FIG. 4 Part of a longitudinal cross section of the labyrinth seal of FIG. 3.

For the coupling by means of the tenon and mortise joint system 3, at least one face or surface, e.g. an axial circular face or surface A1 (i.e whose normal vector is parallel to the seal cartridge longitudinal axis) or a radial circular face or surface C1 (i.e. whose normal vector extends radially from the longitudinal axis of the seal cartridge), of the TMRS component comprises one or several tenons 31 and/or one or several mortises 32 as shown in FIGS. 2-4. FIG. 2 shows a TMRS component that is a housing component of the cartridge and which comprises an even number of tenons 31 configured for cooperating with mortises 32 of a labyrinth seal shown in FIG. 3. FIG. 4 shows a detailed view of the tenon and mortise joint or coupling of the housing component of FIG. 2 with the labyrinth seal of FIG. 3.

In particular, the tenon 31 according to the invention is a projecting part of the TMRS component comprising a groove 311 configured for receiving a mortise head or edge 321. The tenon 31 further comprises a projecting head 312 configured for sliding in a groove 322 of the mortise when the TMRS is rotated around the longitudinal axis A from the loose position to the secured position relatively to another TMRS component or the shaft casing, wherein in the loose position, the TMRS component can be removed from a contact with said another TMRS component or shaft housing, and in the secured position, separation between the latter is prevented by the coupling of each tenon with a mortise. During said rotation and due to the latter, the TMRS component faces or surfaces comprising the tenon and/or mortise are pressed against adjacent faces or surfaces of said another TMRS component or of the shaft casing so that said faces or surfaces of the TMRS component are in contact with the faces or surfaces of said another TMRS component or shaft casing, providing notably a sealing between the TMRS component and said another TMRS component or shaft casing. The mortise 32 is or comprises typically a groove 322 or hole or cavity made in the body of a TMRS component of the seal cartridge and configured for receiving the tenon 31, in particular tenon projecting head 312, of said another TMRS component or of the shaft casing in order to form a joint. Preferentially, the mortise groove 322 extends along the whole circumference of the TMRS component, forming for instance a flange around said circumference, and the mortise edge 321 or head extends only along a part of said circumference, according to an arc whose length equals at least the length of the arc defined by the tenon 31 when measured at a same radius from the longitudinal axis. Preferentially, the mortise 32 of a TMRS component comprises an axial contact face M1 covering an angular sector S of the size of the tenon (by "size" of the tenon, it is referred to the size of the arc described by the latter) of another TMRS component with which it as to be coupled, and configured for being placed in contact with a contact surface T1 of said another TMRS component, wherein said contact surface T1 is an axial face or surface located in an angular sector between two successive tenons of said another TMRS component when the TMRS component is in the loose position. The contact face M1 is radially limited by the mortise edge 311. By rotating the TMRS components relatively to one another, the contact face M1 is moved in an angular sector occupied by one of said two successive tenons 31, the projecting head 312 of one of said two successive tenons 31 sliding in the mortise groove 322 located between the contact face M1 and the body of the TMRS component, and the mortise edge 311 of this contact face M1 sliding in the tenon groove 311 located between the projecting head 312 and the body of the TMRS component. According to the claimed mortise and tenon joint system 3, faces or surfaces of TMRS components that have to be coupled with each other comprises an even number annular sectors S of preferentially identical size, each second sector comprising either a tenon 31 or a mortise 32, wherein each tenon 31, resp. mortise 32, is configured for cooperating and interlocking with a mortise 32, resp. a tenon 31, of said another TMRS component. Each the tenon 31, resp. mortise 32, occupies annular sectors of adjacent faces of TMRS components that have to be coupled together for forming the seal cartridge. According to the present invention, and preferentially, the rotation for clamping or coupling two TMRS components with each other may take place clockwise or counterclockwise, i.e. both directions of rotation are enabled at the same time by the tenon and mortise joint system 3 which facilitate the assembly of the seal cartridge.

Figure 5:
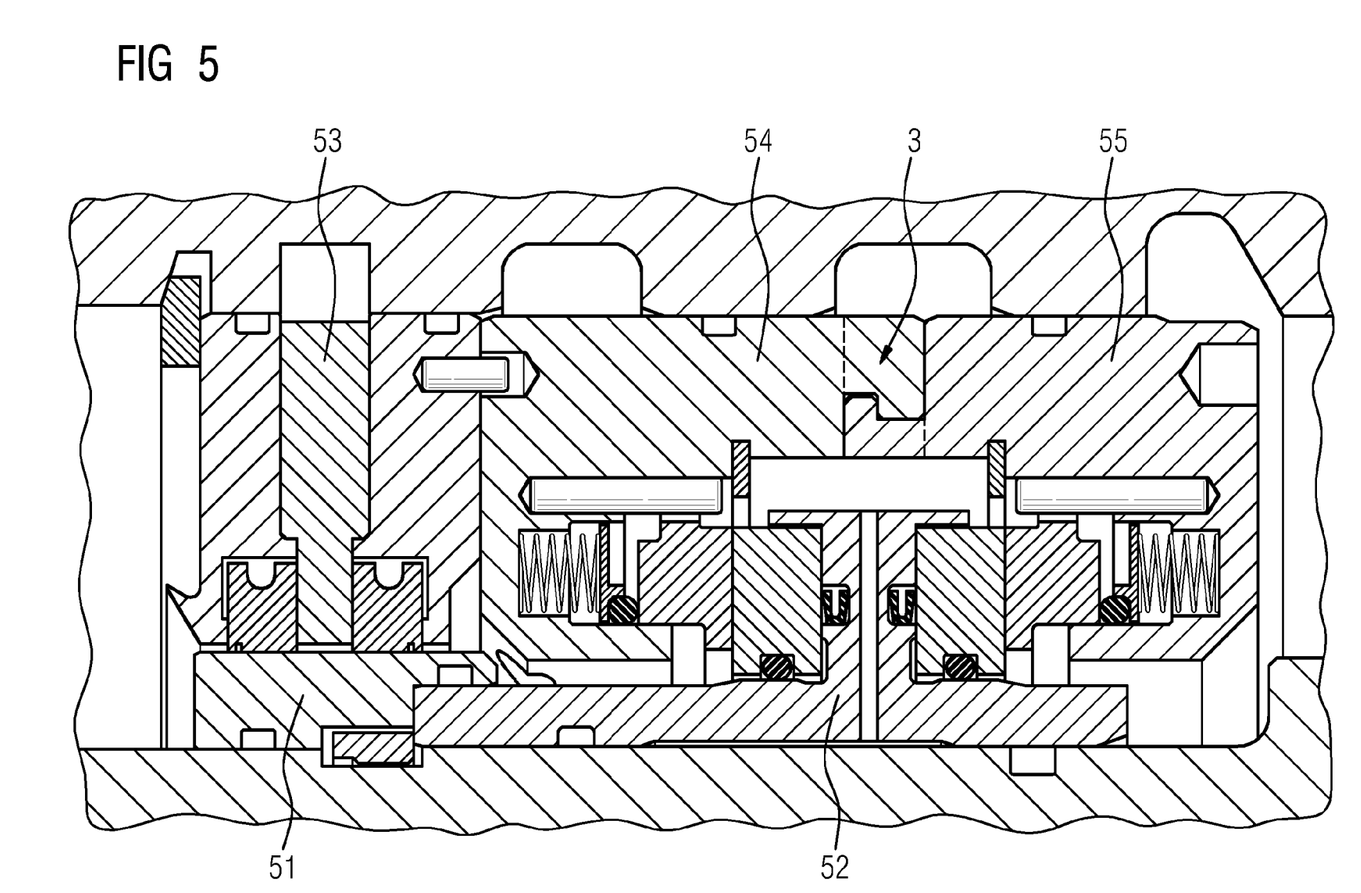
FIG. 5 Schematic illustration of a first preferred seal cartridge according to the invention (side view).
Figure 6:
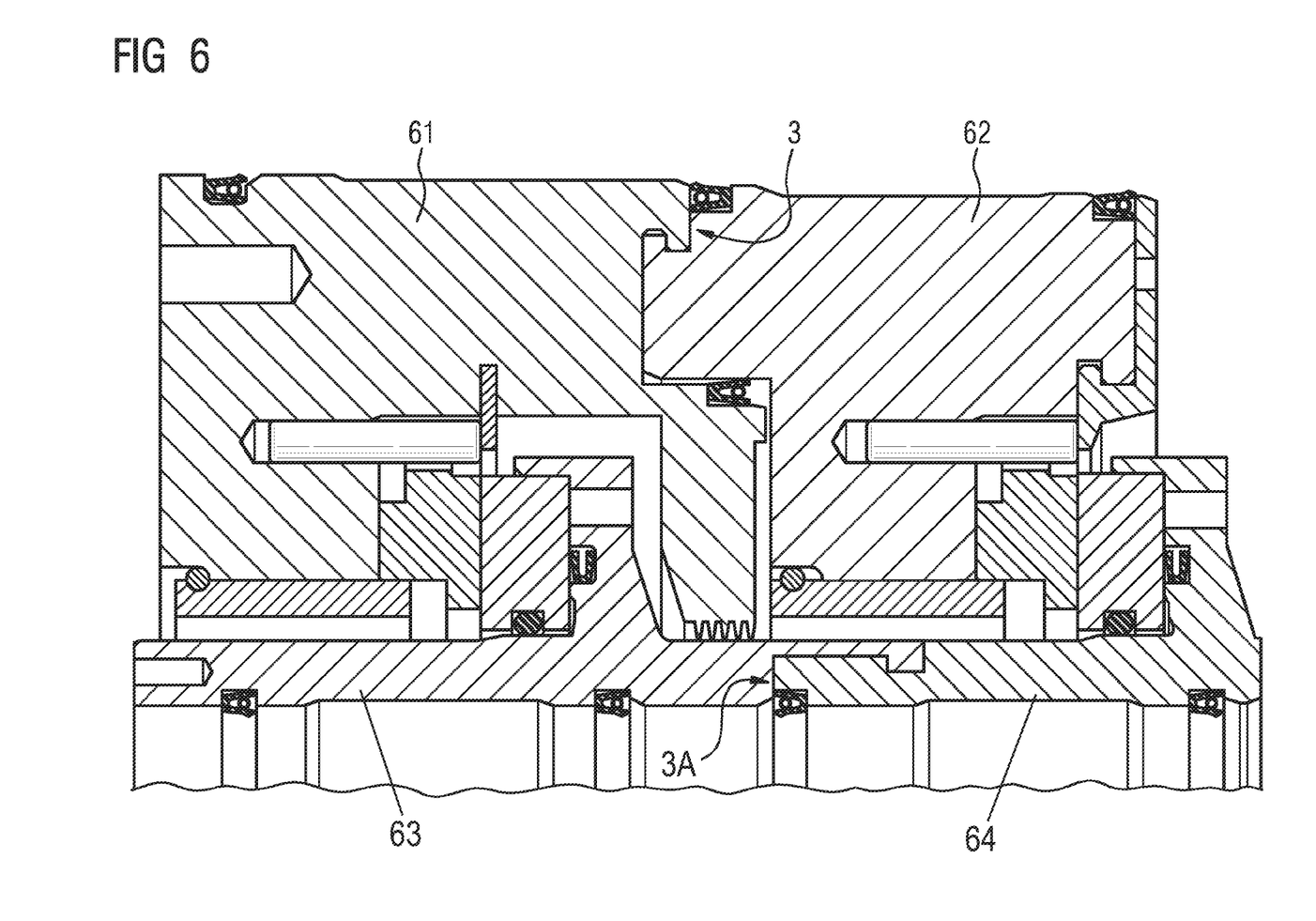
FIG. 6 Schematic illustration of a second preferred seal cartridge according to the invention (side view).
Figure 7:
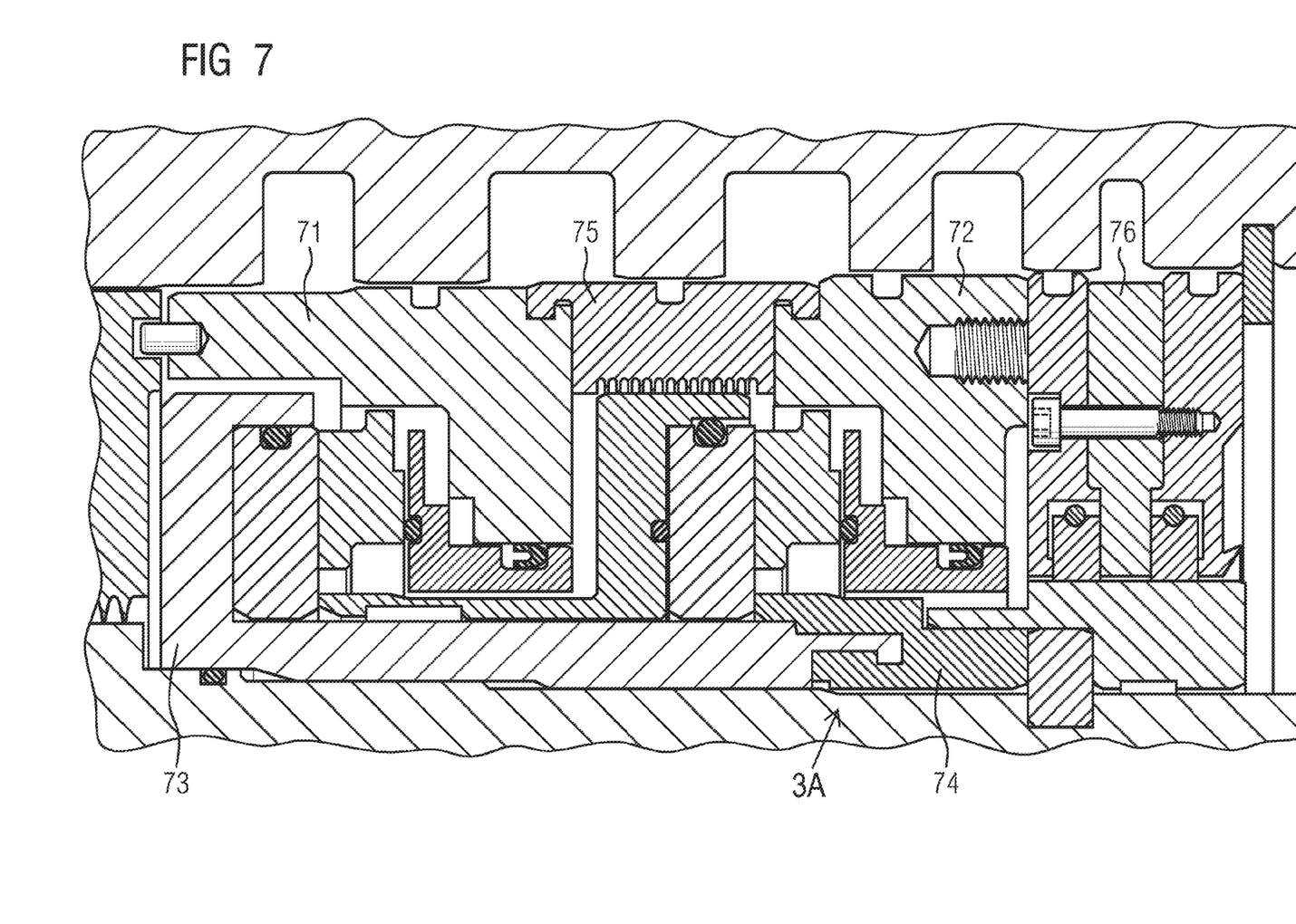
FIG. 7 Schematic illustration of a third preferred seal cartridge according to the invention (side view).

FIGS. 5 to 7 present preferred seal cartridge embodiments according to the invention. They are preferentially dry gas seal cartridges. In particular, the seal cartridge of FIG. 5 comprises a first rotary shaft sleeve 51 contacting an axially adjacent second rotary shaft sleeve 52, wherein the first shaft sleeve 51 supports radially a seal barrier 53 comprising either a tenon and mortise joint system or a screw joint system for coupling the seal barrier 53 to a primary housing component 54, the latter being coupled to a secondary housing component 55 by means of a tenon and mortise joint system 3 according to the invention. The primary housing 54 and the secondary housing 55 comprise each seal components that operate in parallel in a back-to-back configuration characteristic of the well-known double opposed gas seal.

FIG. 6 shows a tandem gas seal wherein the TMRS components according to the invention are a primary housing 61 and a secondary housing 62 coupled with each other by means of a tenon and mortise joint system 3, wherein the primary housing 61 is located radially over a first shaft rotary shaft sleeve 63 coupled to a second axially adjacent rotary shaft sleeve 64 radially over which the secondary housing 62 is installed. The coupling between the first shaft sleeve 63 and the second shaft sleeve 64 is preferentially realized by means of a second tenon and mortise joint system 3A according to the invention.

Figure 8:
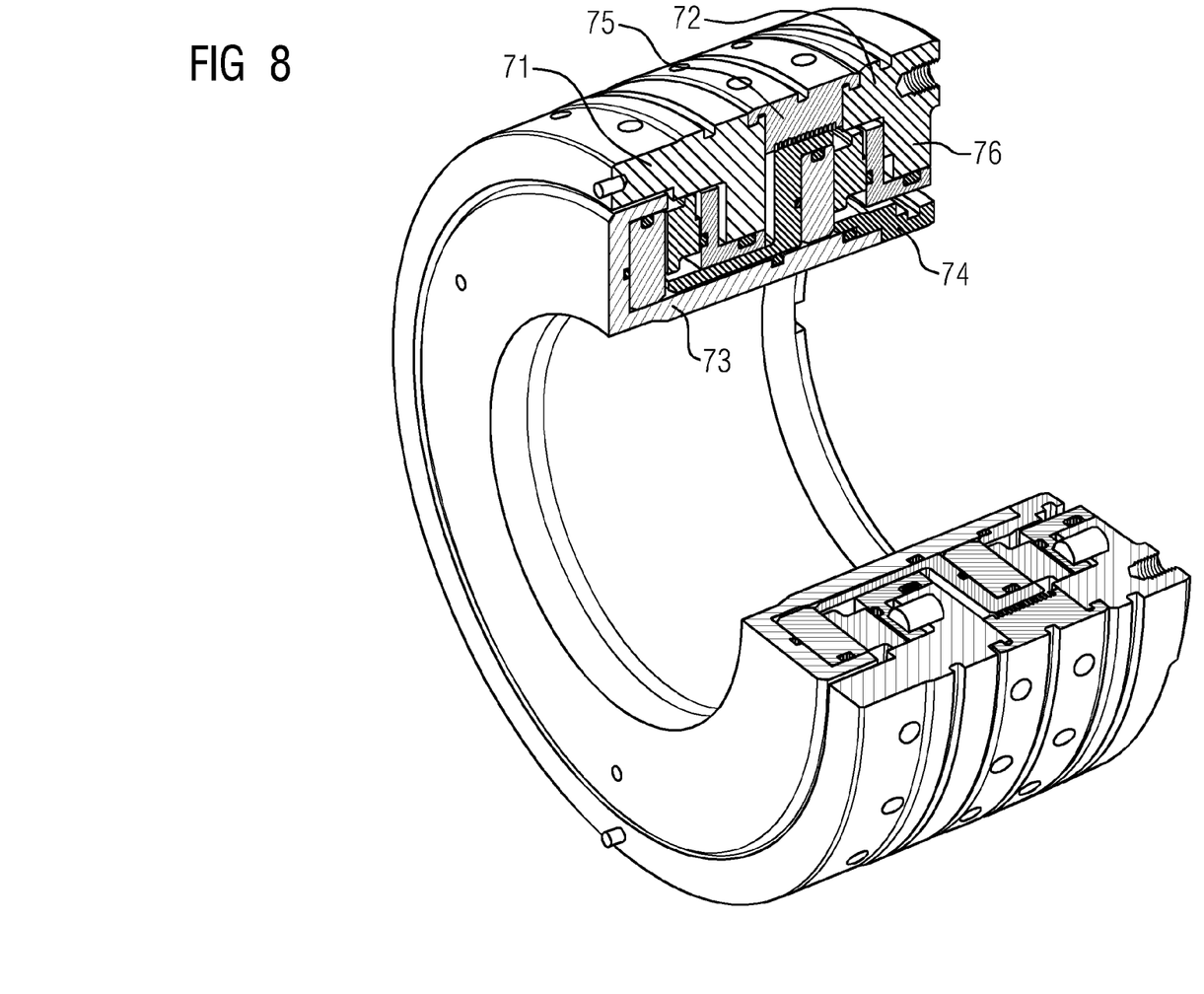
FIG. 8 Three-dimensional schematic illustration of the seal cartridge of FIG. 7.

FIG. 7 shows a tandem gas seal with intermediate labyrinth seal 75 wherein the TMRS components according to the invention are a primary housing 71 coupled by means of a first tenon and mortise joint system according to the invention to one axial annular side of the labyrinth seal 75, the other axial annular side of the labyrinth seal 75 being coupled to a secondary housing 72 by means of a second tenon and mortise joint system according to the invention. The primary housing 71 is located radially over a first shaft rotary shaft sleeve 73 coupled to a second axially adjacent rotary shaft sleeve 74 radially over which the secondary housing 72 is installed. The coupling between the first shaft sleeve 73 and the second shaft sleeve 74 is preferentially realized by means of a third tenon and mortise joint system 3A according to the invention. Optionally, a seal barrier 76 axially adjacent to the secondary housing 72 might be coupled to the latter by means of a fourth tenon and mortise joint system according to the invention. FIG. 8 presents a three-dimensional view of the tandem gas seal with intermediate labyrinth seal of FIG. 7, and uses the same references.

As usual for seal cartridges, additional seal components might be arranged or installed within or supported by the housing components presented in FIG. 5-8. The latter show preferred embodiments of the seal cartridge according to the invention for the specific type of tandem, tandem with intermediate labyrinth seal and double opposed gas seal configurations. As previously explained, other configurations are possible, wherein at least one, preferentially two TMRS components equipped the seal cartridge according to the invention.

Figure 9:
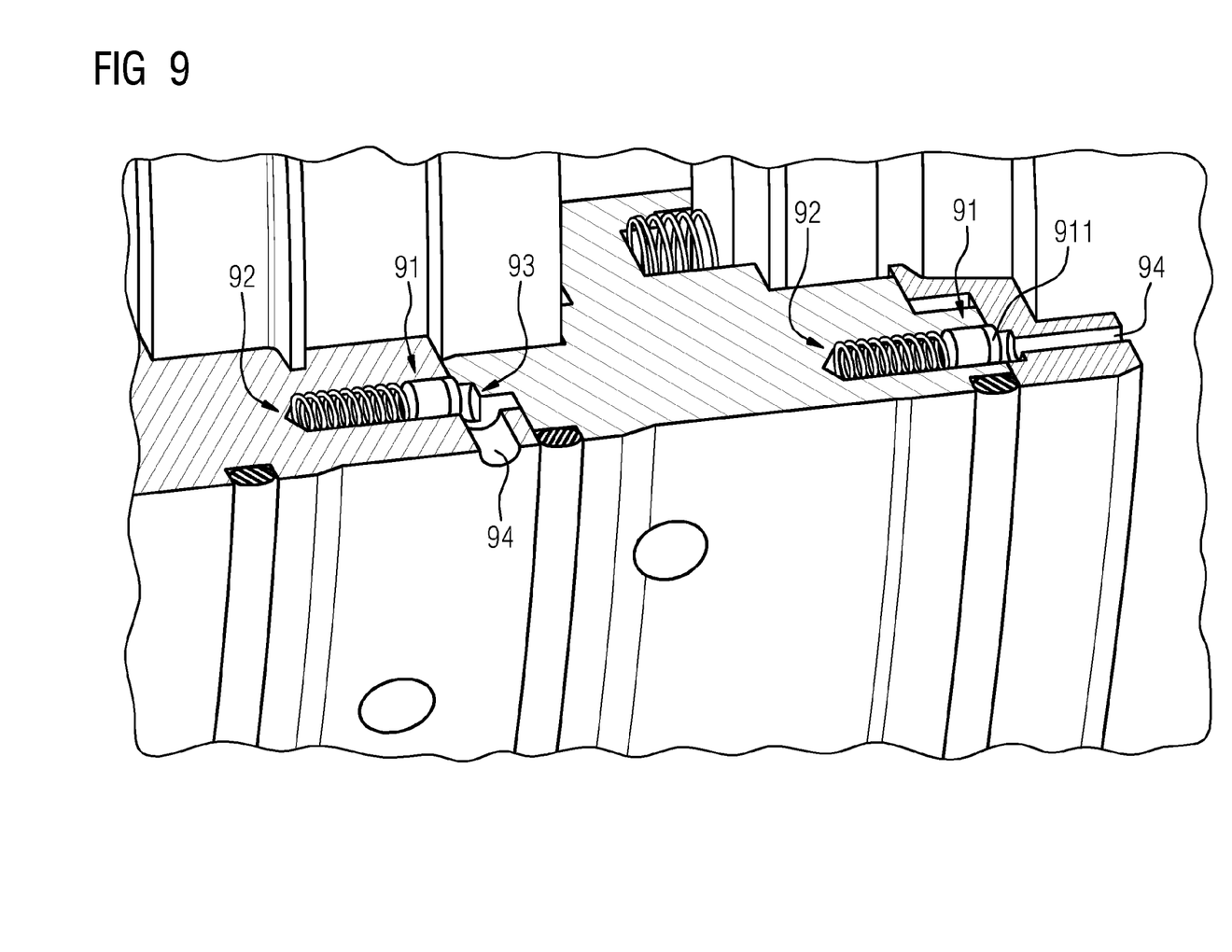
FIG. 9 Schematic illustration of a pin system according to the invention.
Figure 10:
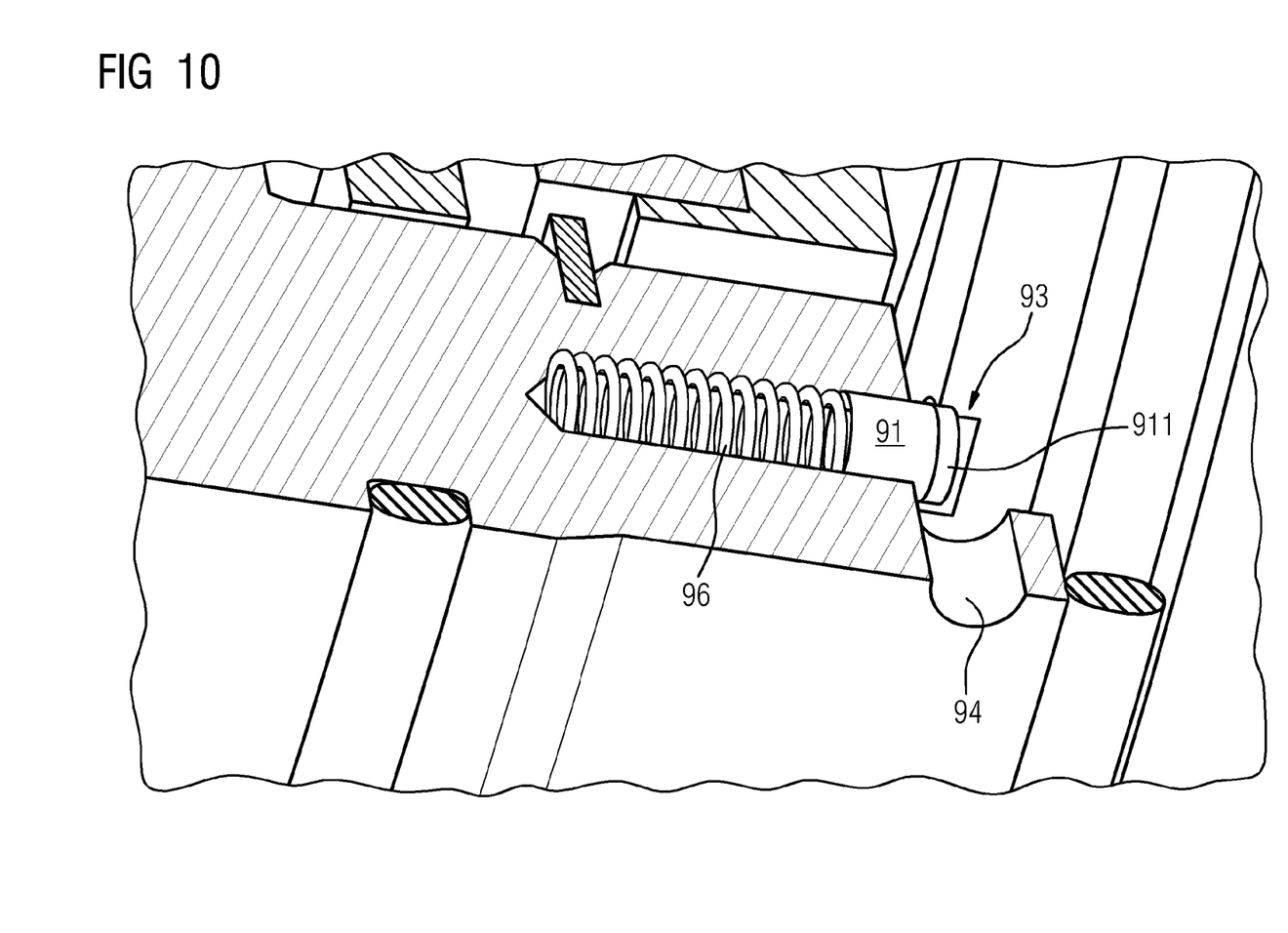
FIG. 10 Details of the pin system according to the invention.

FIGS. 9 and 10 present a pin system according to the invention, wherein said pin system is configured for securing a TMRS component with another TMRS component and/or with the shaft casing when they are mounted against each other, i.e. when they are coupled by means of the tenon and mortise system according to the invention. The pin system comprises a pin 91, preferentially cylindrical, configured for moving, preferentially axially or radially with respect to the longitudinal axis of the seal cartridge, within a hole or cavity 92 arranged in the body of the TMRS component, between a withdrawn position wherein the pin 91 is entirely located inside the hole or cavity 92 and a secured position wherein a pin head 911 is located outside said cavity.

Said cavity 92 is configured for opening onto a face of the TMRS component that is configured for contacting another face of said another TMRS component or shaft casing when they are coupled to each by rotation by means of the tenon and mortise joint system. Said face is for instance an annular sector S1 comprised between two adjacent tenons or two adjacent mortises (see FIG. 2). As long as the TMRS component is in its loose position with respect to said another TMRS component or shaft casing, said another face pushes the pin 91 inside its cavity 92. By relative rotation of the TMRS component around the longitudinal axis of the seal cartridge and with respect to said another TMRS component or shaft casing, another cavity or hole 93 arranged in the body of said another TMRS component or shaft casing is brought in direction to the pin. In the secured position of the TMRS component, the pin cavity 92 and said other cavity or hole 93 are facing each other and aligned with each other, enabling the pin 91 to move from the withdrawn position to the secured position, wherein its head 911 is fitted inside said other cavity 93, which is, in other words, configured for receiving said pin head 911.

According to the present invention, each TMRS component comprises preferentially either said cavity 92 or said another cavity 93 of the pin system, wherein said cavity 92, resp. said other cavity 93, is configured for facing the other cavity 93, resp. the cavity 92, of another TMRS component or of the shaft casing when the TMRS component is coupled to said another TMRS component or shaft casing by means of the tenon and mortise system, and therefore in the secured position. In the secured position, the pin 91 is fitted in said other cavity 93 and prevents therefore any relative rotation of the coupled bodies. Preferentially, an access opening 94, for instance a radial or axial access opening, is arranged in the body of the TMRS component or of said another TMRS component or of said shaft casing for providing access to the pin head 911 from the exterior of the seal cartridge, enabling an operator or a machine to push the pin in its withdrawn position while the TMRS component is coupled to said another TMRS component or shaft casing. Pushing the pin 91 back in its withdrawn position unlocks the tenon and mortise joint system by enabling the relative rotation of the TMRS component with respect to said another TMRS component or shaft casing, and enables to disassemble the coupled TMRS components or to remove the seal cartridge from the shaft casing. Preferentially, a spring 96 arranged in the cavity 92 between the end of the latter and the pin 91 is configured for maintaining the pin 91 in the secured position. In order to unlock the tenon and mortise joint system, the pin 91 is moved in a direction opposed to the force applied by the spring 96 on the pin 91, compressing the spring towards the cavity end so that the pin reaches its withdrawn position which enables the free rotation of the TMRS component with respect to said other TMRS component or shaft casing.

To summarize, the present invention proposes a seal cartridge comprising one or several ring-shaped sealing components configured for being mounted annularly around a rotatable shaft, wherein at least one of said ring-shaped sealing component is configured for being coupled/fixed to another ring-shaped sealing component and/or shaft casing by means of a tenon and mortise joint system. The ring-shaped sealing component can be any annular component of the seal cartridge that is suitable for the claimed joint system: it can be a stationary ring-shaped sealing component or a rotary ring-shaped component. For this purpose, the ring-shaped component comprises tenons and/or mortises of the joint system, wherein each tenon, resp. mortise, is configured for cooperating with a mortise, resp. tenon, of the joint system of said another ring-shaped scaling component or shaft casing for coupling the latter together by relative rotation around the longitudinal axis of the seal cartridge. Preferentially, the seal cartridge according to the invention comprises at least two ring-shaped sealing components configured for being coupled together by means of the joint system according to the invention, wherein one of the ring-shaped sealing components comprises said tenons and/or mortises of the joint system, wherein each tenon, resp. mortise, is configured for cooperating with a mortise, resp. tenon, of the other ring-shaped sealing component for coupling the latter together by relative rotation around the longitudinal axis of the seal cartridge. The joint system of each TMRS component is therefore configured for cooperating with a reciprocal joint system equipping said another ring-shaped sealing component or shaft casing, wherein the reciprocal joint system comprises tenons and/or mortises configured for cooperating with the tenons and/or mortises of the TMRS component. Finally, a pin system preferentially equips the TMRS component for locking in position, i.e. blocking the rotation, of the TMRS component with respect to the coupled ring-shaped sealing component or shaft casing.

The use of the tenon and mortise joint system for coupling ring-shaped sealing components of the seal cartridge provides several advantages compared to existing seal cartridges. Notably, it makes the cartridge less complex and more compact, and it further simplifies the machining of the components of the cartridge. Indeed, while using screws and/or bolts as fixing means results in a complex machining and complex geometry of the different components of the cartridge, requiring to foresee a suitable space and location for each fixing means so that it remains accessible for an operator when assembling or disassembling the cartridge, the present invention makes the axial coupling of the ring-shaped sealing components free of such screw and/or bolt fixing means. Consequently, it decreases engineering and material costs that may result from the use of non-standard screws and material. Finally, it also facilitates the assembling and disassembling of the cartridge.

The invention claimed is:

1. A seal cartridge suitable for providing a sealing between a rotatable shaft and a shaft casing, the seal cartridge comprising a hollow shape around a longitudinal axis, the seal cartridge comprising:
   a set of sealing components suitable for being removably assembled with each other so as to form the seal cartridge, wherein each of said sealing component is suitable for being mounted annularly around the rotatable shaft;
   wherein at least one of said sealing components comprises a TMRS component which is suitable for being secured to another sealing component of said set and/or to the shaft casing by a tenon and mortise joint system,
   wherein the TMRS component comprises a pin system for securing the TMRS component to said another sealing component and/or shaft casing, wherein said pin system is configured for preventing their relative rotation,
   wherein the pin system comprises a pin suitable for moving in an axial direction in a hole arranged in a body of the TMRS component, said hole being suitable for being axially aligned with a cavity of said another sealing component or shaft casing when they are coupled together,
   wherein the pin is configured to move in the axial direction between a secured position wherein the pin is located in both the hole and in the cavity and a withdrawn position wherein the pin is located completely inside the hole,
   wherein in the secured position, respectively withdrawn position, the relative rotation between the TMRS component and said another sealing component and/or shaft casing is prevented, respectively authorized.

2. The seal cartridge of claim 1,
   wherein said hollow shape is a substantially cylindrical hollow shape around the longitudinal axis and the sealing components of said set are ring-shaped sealing components.

3. The seal cartridge of claim 1,
   wherein the TMRS component has an inner diameter suitable for matching a size of the shaft, said TMRS component being a shaft sleeve.

4. The seal cartridge according to claim 1,
   wherein the TMRS component has an outer size or diameter suitable for matching the size of the shaft casing, said TMRS component being a housing component.

5. The seal cartridge according to claim 1,
   wherein the TMRS component is suitable for remaining stationary during a rotation of the rotatable shaft.

6. The seal cartridge according to claim 1,
wherein the TMRS component comprises at least one part suitable for rotating together with the rotatable shaft during a rotation of the rotatable shaft.

7. The seal cartridge according to claim 1,
wherein the TMRS component is a housing component of the seal cartridge and said another sealing component comprises:
a labyrinth seal of the seal cartridge; or
another housing component of the seal cartridge; or
a barrier seal of the seal cartridge; or
a stationary sleeve of the seal cartridge; or
a stationary seal ring of the seal cartridge.

8. The seal cartridge according to claim 1,
wherein the TMRS component is a rotatable shaft sleeve of the seal cartridge and said another sealing component comprises:
another shaft sleeve of the seal cartridge; or
a rotatable seal ring of the seal cartridge; or
another component of the seal cartridge or of the shaft casing suitable for rotating together with the rotatable shaft sleeve.

9. The seal cartridge according to claim 1,
wherein the joint system is suitable for ensuring a coupling of the TMRS component to said another sealing component and/or shaft casing by relative rotation, around said longitudinal axis, of the TMRS component with respect to said another sealing component and/or shaft casing.

10. The seal cartridge according to claim 1,
wherein the joint system of the TMRS component comprises one or several tenons and/or one or several mortises,
wherein each tenon, respective mortise, is suitable for cooperating with a mortise, respective tenon, of a joint system equipping said another sealing component and/or shaft casing, for securing or fixing the TMRS component to said sealing component and/or shaft casing, by rotating the TMRS component relatively to said another sealing component and/or shaft casing from a loose position to a secured position.

11. The seal cartridge according to claim 10,
wherein a spring of the joint system is located in said hole and suitable for maintaining the pin in the secured position.

* * * * *